J. W. & E. C. FAWKES.
AERIAL TROLLEY CAR.
APPLICATION FILED MAR. 9, 1911.
1,051,093.
Patented Jan. 21, 1913.
2 SHEETS—SHEET 1.
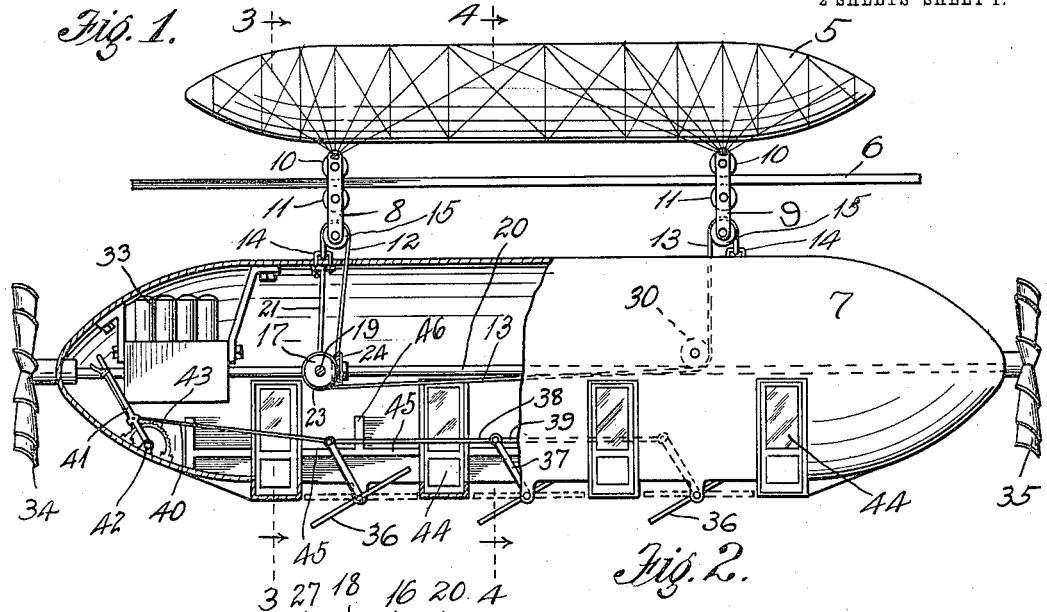
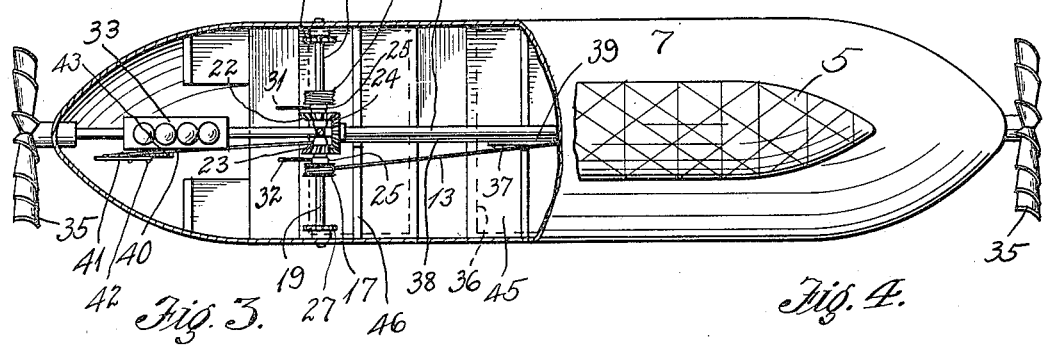
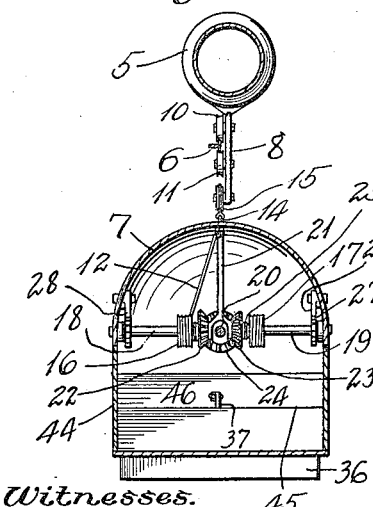
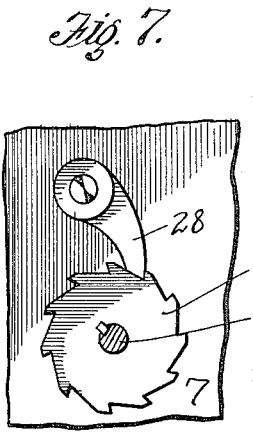
Witnesses.
E. R. Pollard
E. Stadlman
Inventors.
Joseph W. Fawkes.
and Emma C. Fawkes.
By Hazard & Mines
Attys.

J. W. & E. C. FAWKES.
AERIAL TROLLEY CAR.
APPLICATION FILED MAR. 9, 1911.

1,051,093.

Patented Jan. 21, 1913.
2 SHEETS—SHEET 2.

Witnesses.
E. R. Pollard
E. Stadtman

Inventors.
Joseph W. Fawkes.
and Emma C. Fawkes.
By Hazard & Strauss
Attys.

UNITED STATES PATENT OFFICE.

JOSEPH W. FAWKES AND EMMA C. FAWKES, OF BURBANK, CALIFORNIA.

AERIAL TROLLEY-CAR.

1,051,093. Specification of Letters Patent. Patented Jan. 21, 1913.

Application filed March 9, 1911. Serial No. 613,241.

*To all whom it may concern:*

Be it known that we, JOSEPH W. FAWKES and EMMA C. FAWKES, citizens of the United States, residing at Burbank, in the county of Los Angeles and State of California, have invented new and useful Improvements in Aerial Trolley-Cars, of which the following is a specification.

This invention relates to improvements in aerial vehicles, and particularly to that class of vehicles that are adapted to be guided and held in position by a trolley line wire, or other suspended support.

It is an object of this invention to provide an aerial trolley vehicle which is provided with a balancing buoyant member and which carries propelling means, the said vehicle being provided with means for tilting it at various inclines with respect to the trolley line or support to accommodate the car to various inclinations in the course of its travel.

It is also an object of the invention to provide means for assisting the buoyant action of the buoyant member in moving the vehicle up inclined portions of the trolleyway.

Figure 5:
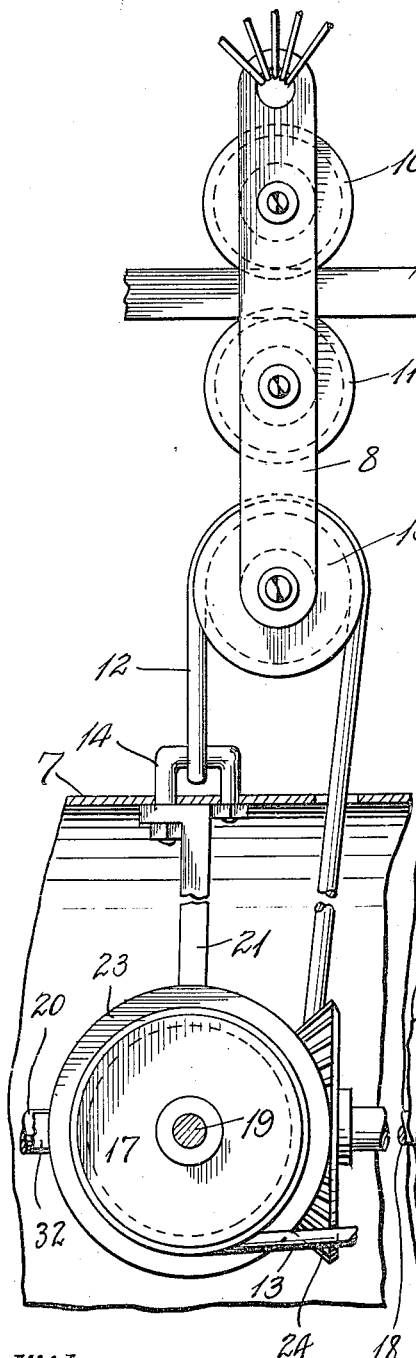
Figure 6:
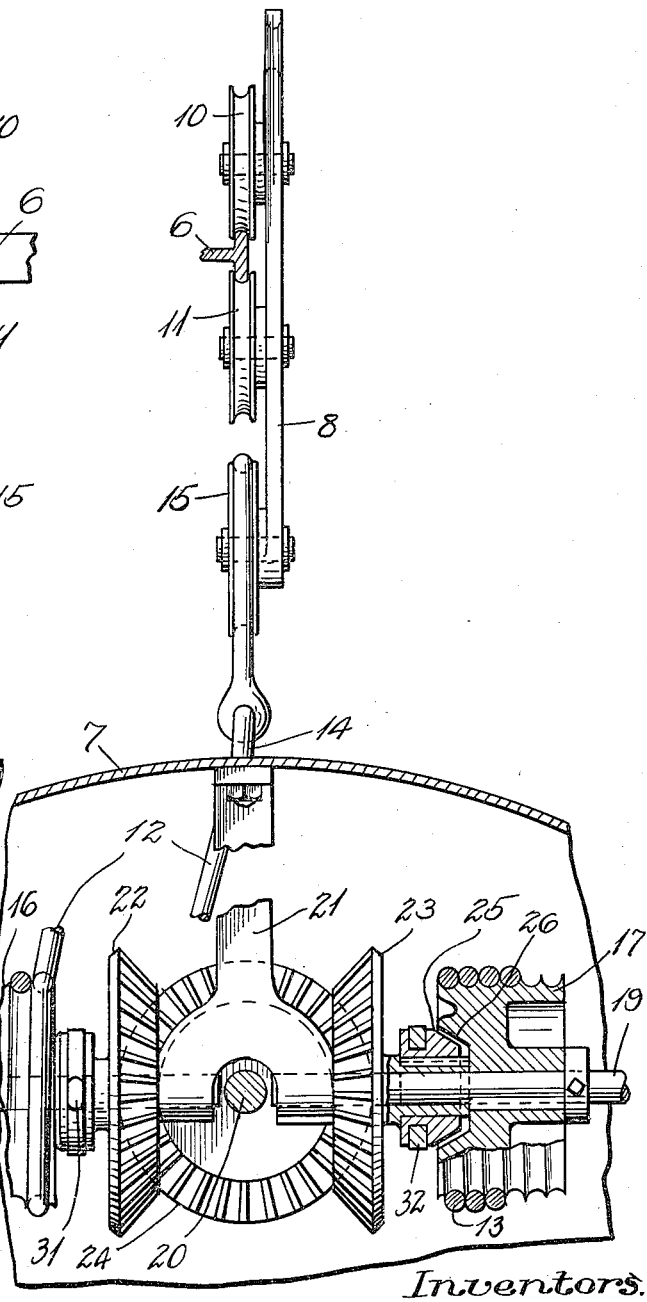

In the annexed drawing forming a part of this specification, Figure 1 is a side elevation of the improved aerial vehicle, a portion of the car thereof being shown in central longitudinal section. Fig. 2 is a top plan view, a portion of the vehicle member and the car casing being broken away to reveal the interior arrangement of the parts. Fig. 3 is a transverse sectional view taken upon the line 3—3 of Fig. 1. Fig. 4 is a transverse sectional view taken upon the line 4—4 of Fig. 1. Fig. 5 is an enlarged detail fragmentary view showing one of the adjustable means for supporting the car to the buoyant member and the trolley with the gearing for actuating the same. Fig. 6 is a detail fragmentary sectional view taken at right angles to the plane of section in Fig. 5 and showing the gearing for controlling the car suspending means. Fig. 7 is a detail view showing one of the ratchets for holding the car supporting mechanism when it is adjusted to the desired extent.

Referring to the annexed drawings, 5 indicates a buoyant member, 6 a trolley way or track and 7 a vehicle car or closure. The buoyant member 5 is connected with the car 7 by means of trolley members or bars as 8 and 9, the said members being connected at their upper ends with the buoyant member 5 by suitable cords or cables of any preferred type. There are preferably 2 of such trolleys near each end of the vehicle member and the bars 8 and 9 each carry upper and lower trolley wheels 10 and 11 which are generally grooved and adapted to fit upon the trolley-way or guides 6. The said trolley way or guide may be of any desired material as for instance a strong wire or an angle bar, and may be supported in any preferred manner.

The trolley guide is usually arranged to conform more or less to the surface of the ground over which it passes, and may be inclined upwardly or downwardly or may be approximately level in accordance with the character of the ground at any particular point.

The car 7 is suspended from the trolley bars 8, 9, preferably by means of adjustable cables or ropes 12, 13. The said cables are connected at one end to eyes or loops 14 fastened to the casing of the car 7, and the said cables are passed over curved pulleys 15 secured to the lower ends of the said trolley bars 8 and 9. From the said pulleys 15 cables pass downwardly and into the casing of the car 7 where they are wound upon drums 16, 17 which are rigidly secured to shafts 18, 19. The said shafts 18, 19 are arranged transversely of the car 7 and find suitable bearings therein. The said shafts are preferably arranged in alinement with each other, there being a sufficient space left between their inner ends to accommodate a power shaft 20 which extends longitudinally of the car 7. The inner ends of the said shafts 18, 19 are therefore usually carried by a hanger 21 secured to the top of the car casing and have a bifurcated or yoked lower end adapted to extend upon opposite sides of the said shaft 20, movably supporting the inner ends of said shafts 18, 19 as clearly shown in Figs. 3, 6.

The shafts 18, 19 are provided with actuating bevel gears 22, 23 adapted to run loose upon the shafts 18 and 19. The said gears 22, 23 mesh with an actuating bevel gear 24 carried by the shaft 20. Upon the hub of each of said gears 22, 23 is splined a friction cone 25 adapted to move longitudinally upon the hubs of the said gears but connected with the said hubs by keys so as to turn therewith. The said cones are adapted to extend into friction cups 26 formed upon the inner surface of the winding drums 16, 17. The said drums 16, 17 will be turned when the cones 25 are forced into engagement therewith, and the said drums are preferably keyed to the shafts upon which they are mounted so that they may be held in positions to which they are moved for winding up the cables by means of ratchets 27 keyed to the said shafts 18, 19 and arranged near the casing of the wall 7 so as to be engaged by dogs 28 which are pivoted upon the inner surface of said casing. The ratchets 27 will hold the drums so as to prevent their being unwound after the cables have been adjusted to the desired lengths.

When the car is to be lowered with respect to the trolleys, the shafts 18, 19 are turned inwardly to a slight extent so as to release the dogs 28 which are thus drawn out of engagement with ratchets 27 until the cables 12, 13 have been unwound sufficiently from the drums.

The winding drums 16, 17, are preferably arranged near one end of the car and the cables 12 extend upwardly through the roof thereof while the cables 13 extend to a point near the other end of the said car and about a guide pulley 30, and thence upwardly through the top of the car 7 to the trolley wheel 15. The cone clutches 25 are adapted to be controlled by levers 31 and 32 which engage annular grooves formed in the said cones. By operating said levers one or the other of the winding drums may be connected with the actuating gearing for altering the suspending length of the cables 12 and 13. One of said cables may be paid out to a greater length than the other to keep the car in an approximately horizontal position when the vehicle is going up an incline or coming down the same. Both of said cables may of course be wound up to the same extent when the car is passing over a level stretch of trolley-way as will be readily understood.

The power shaft 20 is adapted to be rotated by any suitable motor or engine as indicated at 33 usually mounted near one end of the car 7. The said power shaft preferably projects through the ends of the car casing 7 and carries upon its outer ends actuating propellers 34 and 35. By the rotation of the said propellers the car may be positively directed in one direction or the other in accordance with the direction in which the propellers are turned.

Coöperating with the other parts of the mechanism are pivoted aeroplanes 36 which extend transversely of the car and are mounted so as to articulate within recesses formed in the bottom of the car. Each of said planes when in horizontal position, considering the car at the same time in horizontal position, is flush with the bottom portion of the said car 7. Each plane is provided with an actuating mechanism or lever 37 which extends upwardly through the bottom of the car. There are preferably a plurality of such planes 36 and their levers 37 are connected by links 38, 39 so that when one is moved others will be moved correspondingly. The lever 37 of one of the said planes is connected by means of a pitman 40 with an adjusting lever 41 which is pivoted at 42 in the floor of the casing and is controlled by a segment 43, in any well known or usual manner. By adjusting the lever 41 the angle of the aeroplane 36 can be altered with respect to the car 7. By setting the said planes at an angle to the direction of the car, the buoyancy of the car may be increased under motion to assist the same in rising when going up an incline. By the adjustment of the said planes 36 the buoyant effect of the said buoyant member 5 may thus be increased or diminished in accordance with whether the car is proceeding up or down an incline.

The car is preferably provided upon each side with a series of doors 44 formed in the opposite sides of the said car, the floor of the car at these doors being extended straight across from one door to the other as will be clearly understood by reference to Fig. 3. Between the doors, seats 45 may be arranged to accommodate passengers, the seats being thus disposed opposite sides of the aisles extending between the doors, and backs as 46 may be arranged at points between the doors for the comfort of the passengers.

The operation of the car will be fully understood in connection with the above description. The buoyant member 5 approximately offsets the weight of the car 7, the weight of the latter however, being slightly heavier than is sufficient to off-set the buoyant action of the said member 5. The trolleys will thus travel upon the trolley-ways with great facility since no great weight will be disposed upon them. In propelling the car the engine 33 is operated for driving the propellers in the direction desired for causing the car to move along the trolley way. If the trolley-way ascends an incline, the clutches effecting the winding drums may be operated for lowering the front end of the car so as to maintain the same approximately horizontal and to assist the action of the buoyant member. The planes 36 are set at such an angle as to tend to lift the car in the direction of the buoyant member. When the car passes down an inclined portion of the trolley-way, the supporting cables 12 and 13 may be readjusted to bring the car to an approximately horizontal position again through the manipulation of the levers 31 and 32, the power of such adjustment always being taken from the main power shaft 20 of the vehicle. The planes 36 may always be set at an angle in one direction or the other to shunt the buoyancy of the buoyant member 5, or may be allowed to remain horizontal or flush on the under surface of the car when their action is not required.

What we claim is;—

1. An aerial vehicle comprising a car, a buoyant member connected therewith, means for guiding the car upon a trolley way, adjustable means for suspending the car upon the buoyant member, and means mounted upon the car for propelling the same and for operating said adjustable means.

2. An aerial vehicle, comprising a plurality of trolleys adapted to engage a guiding trolley way, a buoyant member above said trolley way connected with said trolleys, and traveling with the vehicle, a car adjustably mounted upon the trolleys, means for varying the adjustment of said car with respect to each trolley for altering the angle of the car with respect to the guiding trolley-way.

3. An aerial trolley vehicle, comprising trolley members, a car, a motor thereon capable of propelling the car independent of a trolley way, adjustable cables connecting the car with each of said trolleys, and means operable by the motor of the car for adjusting said cables to control the position of the car with respect to the trolleys, and the guide way therefor.

4. An aerial vehicle, comprising a propeller operated car, means for guiding the same, an adjustable means supporting the car on said guiding means at different points whereby the angle of the car may be varied with respect to the guiding means as in making ascents or descents over uneven ground, and a gear driven cable winding mechanism mounted upon the car itself for operating the adjustable supporting means.

5. An aerial vehicle, comprising guiding and supporting means, cables for adjustably sustaining the car from said supporting and guiding means, a power driven mechanism within the car for lengthening or shortening the suspending portions of either or both of said cables, and means for propelling the said vehicle independent of said adjusting means.

6. An aerial vehicle, comprising guiding means, a car mounted thereon, suspending cables for holding the car upon the guiding means and capable of varying the distance from the ends of the car to said guiding means, drums for winding up each of the said cables, a motor carried by the car, propellers driven thereby, and mechanism capable of being also actuated by said motor for operating the said drums.

7. An aerial vehicle comprising guiding and suspending means, a car, means for adjustably supporting each end of the said car from said guiding and supporting means, shafting for adjusting said means, an engine carried by the car for driving said shafting, and propelling means also carried and actuated by said engine.

8. An aerial vehicle comprising a buoyant member, trolleys connected therewith and adapted to engage a trolley way, a car suspended from said trolleys, aeroplanes mounted upon said car and adapted to be set at an angle to assist the buoyancy of the buoyant member and means for propelling said vehicle.

9. An aerial vehicle comprising a car, trolleys for supporting and guiding the same, a balancing buoyant member connected with the said trolleys, suspending cables connecting the car with the said trolley at a plurality of points and capable of varying the angle of inclination of the car with respect to the buoyant member, a series of aeroplanes mounted in the wall of the car, means for tipping them to vary their angle with respect to the car in assisting or resisting the buoyant action of the buoyant member and means for propelling the said car.

10. An aerial vehicle comprising a car, trolley mechanism connected with the same for engaging a trolley-way a buoyant member connected with the car, a shaft mounted longitudinally of the car, and having propellers to drive the car in either direction, an engine carried by the car and adapted to operate said shaft, drums also capable of operating in connection with said shafts, suspending cables connecting the said drums with the said controlling devices, clutches interposed between the drums and the actuating mechanism therefor, a ratchet device for holding the drums in adjusted positions.

11. An aerial trolley vehicle comprising a closed casing, transverse seats arranged in its lower part, and provided with doors for admitting entrance to said car and seats, spaces being arranged within the car below the said seats, aeroplanes pivoted in said spaces and adapted to be brought flush with the bottom of the car, means for rocking the said planes to set them at different angles with respect to the bottom of the car and means for propelling the car in either direction.

12. An aerial vehicle comprising a car, a buoyant member connected therewith, trolleys interposed between the buoyant members and the car, suspending cables connecting said car with said trolley bars, drums for winding the same for controlling their suspension portions, shafting carrying said drums, gearing for operating the shafting, clutches interposed between said gear and the drums for actuating them, a common actuating shaft for rotating the actuating gear, and a motor mounted within the casing for rotating said power shaft.

13. An aerial trolley car comprising a body, a buoyant member in connection with said body and adapted to balance partially the weight thereof, means capable of assisting or counteracting the effect of the buoyant member for facilitating travel up or down an incline, an inclined guiding member for guiding said body to an elevated point or to a depressed point, and means carried by said body for driving the same along said guiding member.

14. An aerial trolley car comprising a body, a buoyant member disposed over said body, a trolley wire for up grades and down grades preventing said buoyant member and said body from moving up or down in a vertical plane with respect to said trolley wire, means carried by said body for driving the same along said trolley wire in either direction, and means capable of varying the effect of the buoyant member in facilitating travel up or down grade.

In witness that we claim the foregoing we have hereunto subscribed our names this 1st day of March, 1911.

J. W. FAWKES.
E. C. FAWKES.

Witnesses:
    EDMUND A. STRAUSE,
    EARLE R. POLLARD.